Nov. 17, 1970 R. A. MEYER 3,541,327
APPARATUS FOR MEASURING THE INTENSITY OF VISIBLE LINES
REPRESENTING THE OUTPUT DATA OF AN ION SPECTROMETER
Filed Oct. 13, 1967
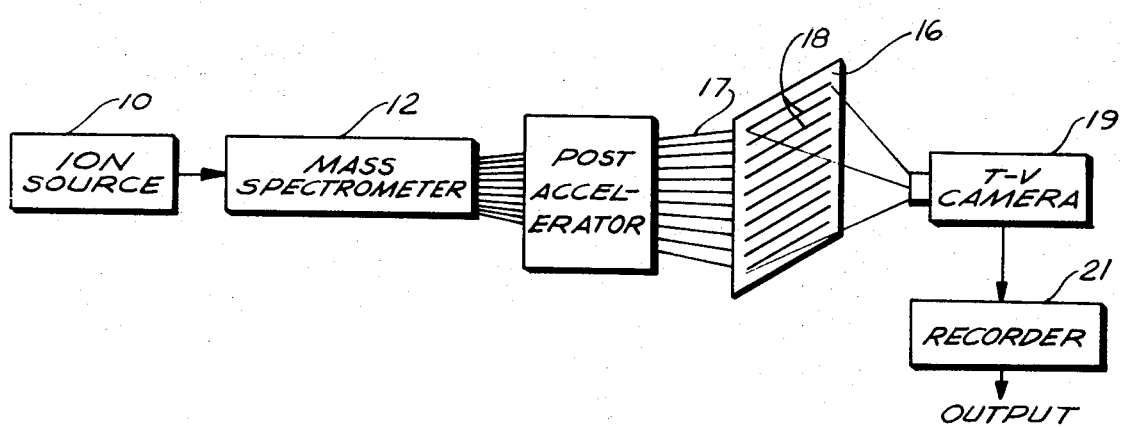
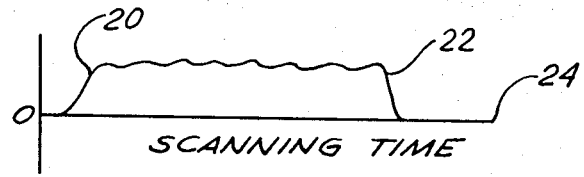
INVENTOR.
RAYMOND A. MEYER
BY
ATTORNEY.

United States Patent Office 3,541,327
Patented Nov. 17, 1970

3,541,327
APPARATUS FOR MEASURING THE INTENSITY OF VISIBLE LINES REPRESENTING THE OUTPUT DATA OF AN ION SPECTROMETER
Raymond A. Meyer, Thousand Oaks, Calif., assignor to North American Rockwell Corporation
Filed Oct. 13, 1967, Ser. No. 675,245
Int. Cl. H01j 39/34
U.S. Cl. 250—41.9                               5 Claims

ABSTRACT OF THE DISCLOSURE

A television camera is used to scan a spectral display generated by a plurality of ion beams forming discrete spectral lines. The camera scans each spectral line and generates a signal characteristic of the intensity of ion beam represented by the spectral line.

BACKGROUND

The present invention is directed to apparatus for sequentially scanning a series of optically percievable displays representing ion beams generated by a mass spectrometer, and producing an intensity characterizing output. Conventional photography techniques for measuring ion beam intensity are seriously limited in range, resolution and sensitivity stability and, therefore, require numerous exposures thereby significantly increasing the time required to obtain meaningful data. In addition, the usual photographic techniques employed have limited precision thereby requiring multiple measurements before accurate data can be obtained.

The present invention overcomes the disadvantages of the prior art arrangements by displaying the ion beams in the form of lines of light and scanning the displayed lines of light with a television camera having one scan direction aligned with the lines. The intensity of each line of light, which is a function of the intensity of the scanned ion beam, is detected by the camera. The camera generates an output signal which is a function of the intensity of the scanned line of light. In this manner an accurate measure of the relative ion beam intensities may be obtained.

SUMMARY

The invention is directed to a spectral data acquisition system whereby spectral data in the form of lines of light is scanned by an electro-optical means and converted to a signal representative of the intensity of spectral data scanned.

Therefore, it is an object of the present invention to provide a spectral data acquisition system which is particularly adapted to provide a fast and accurate method of acquiring intensity measurements of ion and photon beams.

This and other objects of the present invention will become more apparent from the following detailed description of the preferred embodiment of the present invention taken together with the drawing, hereby made a part thereof, in which:

BRIEF DESCRIPTION OF THE DRAWINGS

FIG. 1 shows the preferred embodiment of the present invention in schematic form.

FIG. 2 shows the voltage output of one component of the system of FIG. 1.

DESCRIPTION OF THE PREFERRED EMBODIMENT

Referring now to the drawings in detail, FIG. 1 schematically shows a standard ion source 10 operatively associated with a conventional mass spectrometer 12 and a post accelerator 14 which accelerates the ions to high energies, for example, 40 kilovolts. The ions are separated by the magnet of the mass spectrometer 12, as is well known in the art, and after further acceleration by 14 are directed toward a display screen 16. The screen 16 in the preferred embodiment is an organic scintillator of any well known type having an aluminum coating on the side exposed to the aproaching accelerated and separated beams of ions 17. In this manner the ion beams separated into various planes impinge on the aluminum backing on the scintillator sheet 16 and generate secondary electrons as a result of the interaction of the accelerated ions and the aluminum. These electrons cause photon generation which produce the bars of light 18 on the organic scintillator surface of sheet 16. The bars 18 will be spaced from each other by distances proportional to the mass of the ion beam represented. Since the secondary electron generation is a function of the ion beam intensity, the intensity of the bars of light 18 will be directly related to the ion beam intensity. While the preferred embodiment utilizes a mass spectrometer arrangement for producing the lines of light in the spectral display, it is apparent that other means for forming scannable displays of information in the form of optically perceivable lines of light may be utilized, as is well known in the fields of spectroscopy, astronomy and photometry.

An electro-optical means, preferably a television camera 19 having, for example, an electrostatic scanning vidicon tube such as the RCA 8134, is focused on the scintillator sheet 16 with its horizontal scanning directions aligned with the light bars 18. While the vidicon type tube is preferred, other types of camera tubes may also be used, e.g., the image orthicon type. The output of the camera is a signal as shown in FIG. 2 which is characteristic of the intensity of the beam 17 along its length. If low level signals are encountered an image intensifier, well known in the art, may be interposed between the source of light on screen 16 and the television camera 19. The sweep of the camera starts at zero scanning time and detects one of the bars of light 18 on screen 16. At this time the output of camera 19 increases, see curve 20 of FIG. 2, in proportion to the intensity of the light of the particular spectral display bar 18 being scanned. At the end of the particular spectral display light bar the voltage output decreases, see curve 22 at FIG. 2, to zero for the remainder of the sweep. Since the spectral display 18 usually does not fill the entire sweep, it is apparent that that portion of the sweep between the end or the signal 22 and the end of the sweep 24 could be utilized for automatic dark current subtraction to thereby enhance the signal to noise ratio.

Each sweep of the camera 19 which coincides with a spectral display light bar 18 will result in a voltage signal as shown in FIG. 2. Where no light is detected no output voltage will be generated. The output of the television camera 19 is preferably stored by a recorder 21, for example, on tape, although other storage means may be utilized. The spectral display 18 on sheet 16 is preferably scanned a number of times and each scan recorded in sequence by recorder 21. After an appropriate number of scanning operations, the information stored on the tape may be fed into any standard computer for integrating the intensity data and obtaining relative indications of the concentrations of the various elements contributing to the spectral display.

Alternatively, the recorder 21 may be composed of a standard electrical integrator and multichannel analyzer. In such an arrangement the output signal from camera 19 for each sweep would be integrated and then stored in one channel of a multichannel analyzer in any manner well known in the art. Thus, when the entire screen 16 had been scanned the multichannel analyzer would be reset to the first channel and the screen 16 rescanned. The signals resulting from the second scanning would be added to those previously recorded. When the multichannel analyzer had reached a preselected level, the information could be read out in a form suitable for computer processing.

The spectral data acquision system of the present invention may be utilized in a number of combinations involving programmed digital computers. One such use is disclosed in the copending application of George Lauer entitled "Automatic Data Acquisition System," filed Oct. 13, 1967, Ser. No. 676,672, the disclosure of which is incorporated herein by reference. Other uses and combinations incorporating the data acquisition system of the present invention will be apparent to those skilled in the art. Further, the present invention is not limited to the specific details of the particular embodiment described, since many modifications will be apparent to those skilled in the art. Moreover, the components described, e.g., camera, mass spectrometer, accelerator and recorder, are all standard electronic and electrical circuits and are, therefore, not described in detail. Further, other types of electro-optical cameras as well as other means for producing the scanned lines of light may be used without departing from the scope of the present invention as defined by the appended claims.

I claim:

1. A spectral data acquisition system comprising means for generating an optically perceivable display in the form of lines of light, said display generating means including scintillator means having a coating on one side thereof responsive to ion beams to generate protons which generate said lines of light in said scintillator, the intensity of each of said lines being proportional to the quantity of ions in each of said beams, electro-optical means for scanning said lines of light in a predetermined order and generating a signal representative of the intensity of each of said lines, said electro-optical scanning means having its scanning direction aligned with said lines of light.

2. In a spectral data acquisition system for measuring the intensity of a series of bars of light forming an optically perceivable display on a screen, said optically perceivable display comprising a scintillator means having a coating on one side thereof responsive to ion beams to generate said lines of light in said scintillator, the intensity of each of said lines being proportional to the quantity of ions in each of said beams, an electro-optical means focused on said screen, said means having a horizontal scan direction aligned with the bars of light on said screen, said means sequentially scanning each of said bars of light and generating an output signal representing the intensity of each of said bars of light over its length, and means for recording each of said output signals.

3. A spectral data aquisition system for measuring the intensity of a series of ion beams generated by a mass spectrometer comprising means for generating an optically perceivable display on a screen, said display being in the form of a series of bars of light each representing one of said ion beams, electro-optical means focused on said screen and having a direction of scan aligned with said bars, said electro-optical means scanning each of said bars of light on said screen and generating an output signal representing the intensity of each of said bars.

4. The spectral data acquisition system of claim 3 including means for recording said output signals.

5. The spectral data acquisition system of claim 4 wherein said recording means includes integrator means and multichannel analyzer means responsive to said integrator means for storing each of said output signals.

References Cited

UNITED STATES PATENTS 2,776,377 1/1957 Anger.
2,944,146 7/1960 Schultz.

ARCHIE R. BORCHELT, Primary Examiner

C. E. CHURCH, Assistant Examiner